United States Patent [19]

Hornback

[11] Patent Number: 4,490,741
[45] Date of Patent: Dec. 25, 1984

[54] SYNCHRONIZATION SIGNAL STABILIZATION FOR VIDEO IMAGE OVERLAY

[75] Inventor: Donald L. Hornback, St. Joseph, Mich.

[73] Assignee: Heath Company, St. Joseph, Mich.

[21] Appl. No.: 433,343

[22] Filed: Oct. 8, 1982

[51] Int. Cl.³ .................. H04N 5/04; H04N 5/12
[52] U.S. Cl. .................................................. 358/152
[58] Field of Search ............... 358/148, 150, 152, 182

[56] References Cited

U.S. PATENT DOCUMENTS 3,855,496 12/1974 Ciciora ............................... 358/152
4,096,530 6/1978 Plugge ................................ 358/152

Primary Examiner—Tommy P. Chin

[57] ABSTRACT

A system for stabilizing the synchronization (sync) signal provided to a second video display generating a second video signal for the precise overlay thereon of a first video signal from a first video display having a relatively unstable sync signal is disclosed. The stable sync signal is generated by providing the multiplied unstable sync signal to a phase lock loop synthesizer in generating a higher multiple frequency signal which is synchronous with and phase locked with a sync signal of the first video signal and has a frequency which is an integral multiple of the horizontal active line period. The frequency of this signal is an integral multiple of the number of pixels, or dots, per active horizontal scan line of the second video display. By synchronizing the horizontal scan signal of a second video display with this high frequency signal, an integral number of pixels per horizontal scan line is provided. The synthesized, stable horizontal sync signal is then combined with a stable vertical sync signal to form a stable composite sync signal which is provided to the second video display permitting the synchronized overlay thereon of video signals from both video displays.

13 Claims, 22 Drawing Figures

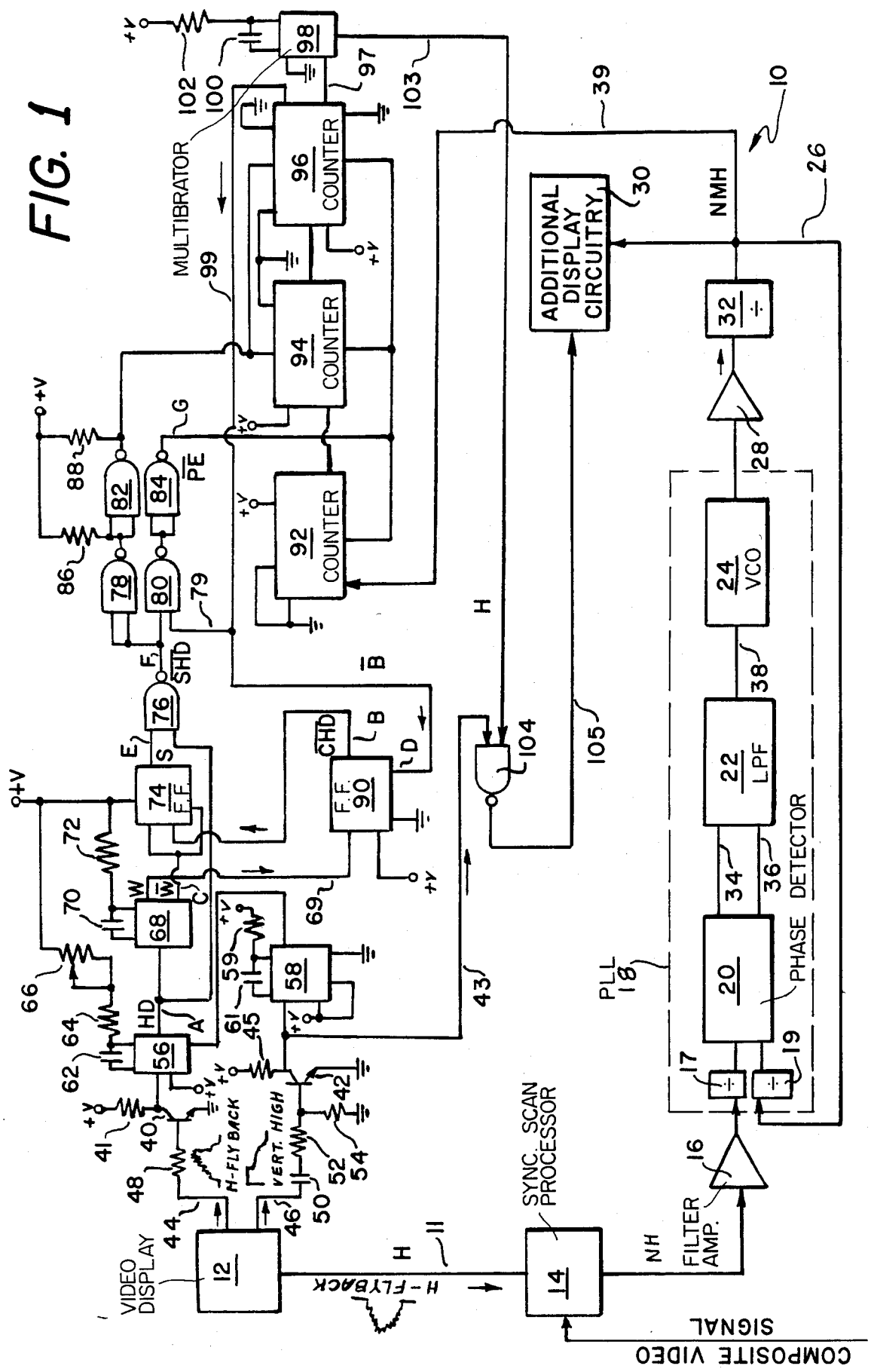

FIELD IN SYNC.

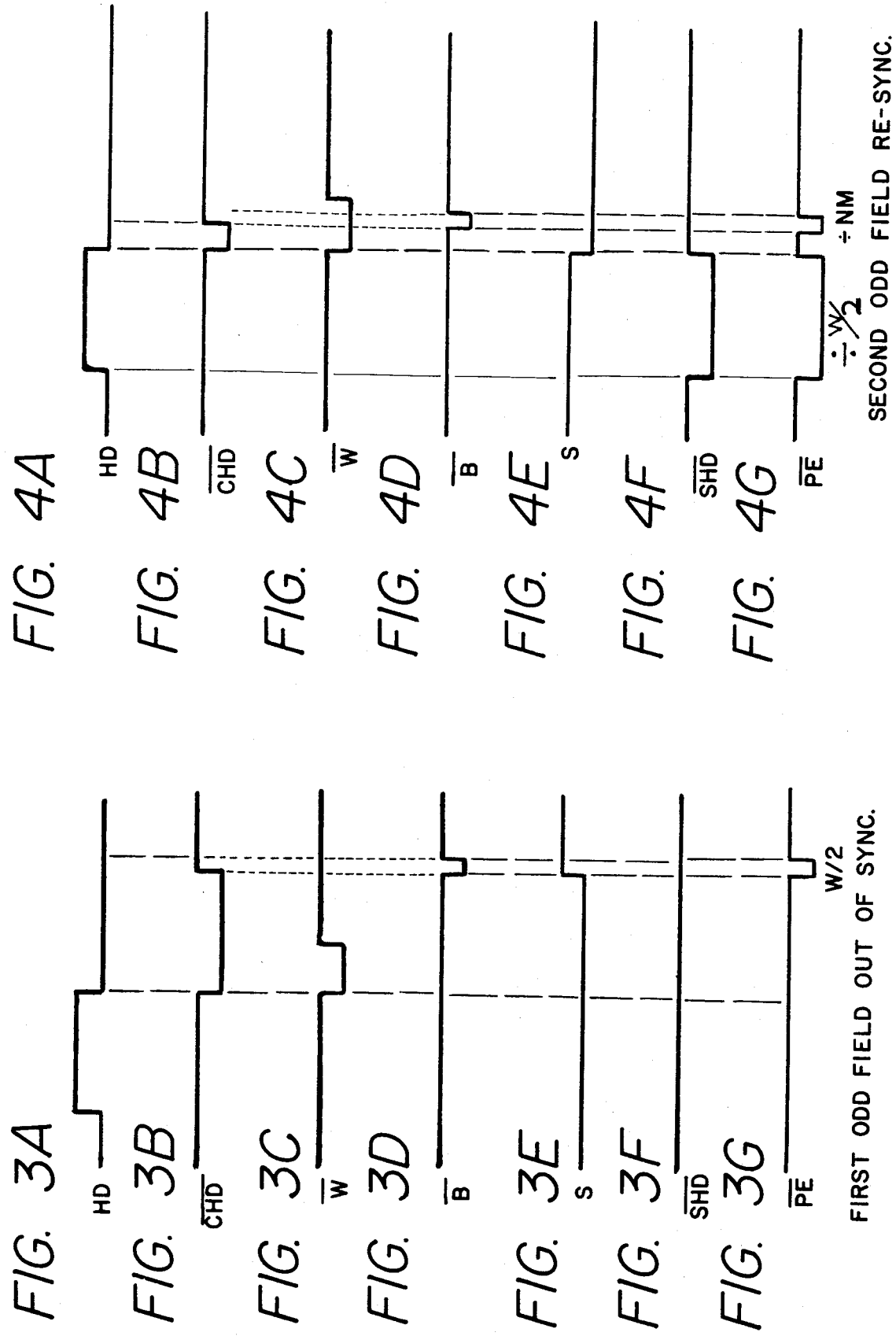

SYNCHRONIZATION SIGNAL STABILIZATION FOR VIDEO IMAGE OVERLAY

BACKGROUND OF THE INVENTION

This invention is directed generally to a system for overlaying a first video signal with a second video signal for presentation on a display device and particularly relates to a system for synchronizing first and second horizontal synchronization signals in a video display for overlaying two video signals for simultaneous presentation thereon.

The signal driving a video display is comprised of a video component and a synchronization component. The video signal portion includes picture information such as luminance and chrominance signals. The synchronization signal portion includes pulse-like signals occurring both at the horizontal and vertical scan rates which are interspersed between the scan interval of the picture component in the period generally referred to as the retrace interval. In addition, the sync pulse signals coincide in time with blanking signals used to blank out the video display during electron beam retrace.

In the case of a television receiver, the composite video and synchronization signals are received from an external signal source such as a broadcast signal transmitter. In the case of a video display as utilized in the terminal of a video game, minicomputer, word processor, or any of the ever-increasing applications in which video displays are employed, the video and synchronization signals are typically generated within the unit itself and provided to the cathode ray tube (CRT) of the terminal in response to user inputs. The overlaying of one video image upon another video image in a single display device is becoming increasingly more popular in performing a variety of functions. This type of image overlaying may be used to provide text information superimposed upon the video display of a television receiver, to overlay various images such as that of a game board upon the image displayed on a television receiver to permit the viewer to play a video game while simultaneously viewing the transmitted signal, or overlaying various images from several signal sources on a single video display for artistic, technical or design analysis and evaluation.

When the video image of a first video display such as a conventional television receiver is overlayed by a second video display such as generated by a video display processor, frequently incompatibilities between the two systems result in a degraded composite video image. This typically arises because the horizontal synchronization (sync) signal in the television receiver is modulated by the television receiver's vertical deflection signal which is generally unstable and subject to slight jitter or modulation. The extent of jitter in the horizontal sync signal of the television receiver may frequently exceed the dimensions of an elemental area (pixel) of an image on the second video display thus making precise and stable image overlay impossible. In addition, the video display clock utilized for generating these elemental areas of an image presented thereon is asynchronous and thus may generate a non-integer number of dots or pixels per active scan line. This undesirable effect is visible to the viewer as an image having irregular, or "zippered" edges. Laterally displaced pixels between adjacent horizontal scan lines also result in indistinct images which also may appear to be subject to a "tearing" effect.

The present invention is intended to avoid these limitations by providing a stabilized composite sync signal and a phase locked pixel or dot clock derived from a first video signal for the precise switched overlay timing of a second video signal while insuring an exact integer number of pixels per active horizontal scan line of a composite, interleaved video signal comprised of the first and second video signals.

OBJECTS OF THE INVENTION

Accordingly, it is an object of the present invention to provide an improved means for overlaying two video images on a single video display.

It is another object of the present invention to provide an improved means for stabilizing the composite synchronization signal of one video display signal for overlay on another video display signal.

Still another object of the present invention is to synchronize first and second video signals for simultaneous overlay presentation on a single video display.

A further object of the present invention is to provide an improved means for synchronizing the horizontal sync of one video display circuit with the horizontal synchronization signal of a composite video signal of another video display circuit.

A still further object of the present invention is to provide an improved synchronization signal stabilization system to permit a first video signal of a first video display having a relatively unstable synchronization signal to be overlayed by a second video signal of a second video display having a relatively stable sync signal with the images of both signals accurately aligned for simultaneous presentation on the first video display.

It is a further object of the present invention to provide the same integral number of elemental image areas (pixels) for all horizontal scan lines of a video display.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

FIG. 1 shows a block and circuit diagram of a system for providing a stabilized synchronization signal derived from a first video display signal to additional video display circuits for the overlay of several images on a first video display signal;

FIGS. 3A–3G show the waveforms of signals present in various portions of the synchronization signal stabilization system of the present invention in which the horizontal flyback pulses of a first video display are not in synchronization with the overlaid video signals, with the letter designation of each waveform corresponding to the various letter-designated locations in the system of FIG. 1; and FIGS. 4A-4G show the waveforms of signals present in various portions of the synchronization signal stabilization system of FIG. 1 in which synchronization of the horizontal flyback pulses of a first video display with the synchronization of the overlaid video signals has been re-established, with the letter designation of each waveform corresponding to a letter-designated location in the system of FIG. 1.

DESCRIPTION OF THE PREFERRED EMBODIMENTS

Figure 2A:
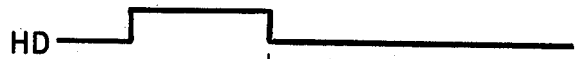
FIGS. 2A–2G show the waveforms of the signals present in various portions of the sync signal stabilization system of FIG. 1 in which the horizontal flyback pulses of a video display are synchronized with the overlayed video synchronization signals, with the letter designation of each waveform corresponding to the various letter-designated locations in the system of FIG. 1.

Referring to FIG. 1, there is shown partially in schematic diagram form and partially in block diagram form a synchronization (sync) signal stabilization system 10 in accordance with the present invention. In general, the sync signal stabilization system 10 receives a horizontal flyback pulse and a vertical high signal from a first video display 12, which in a preferred embodiment is a conventional television receiver, processes these signals and provides a more stable horizontal sync signal which is synchronized and time-aligned with the original sync signal of the first video display 12 to a second (or additional) video display (or displays) 30 for overlaying the second display's image on the first display 12. By thus making one sync signal responsive to the occurrence of the other, video images from each of the video displays may be precisely aligned and displayed in a switched image overlay presentation of the second video display 30 on the first video display 12. The second video display 30 may include a conventional video display processor. In a preferred embodiment of the present invention, the television receiver 12 is of the System 3 chassis type as manufactured by Zenith Radio Corporation and video display 30 is the 9928 Video Display Processor as produced by Texas Instruments Incorporated.

A conventional television receiver 12 includes a synchronization signal scan processor 14 which basically is a phase lock loop frequency multiplier or synthesizer. The sync signal scan processor 14 typically includes an LC oscillator (not shown) maintained in phase lock with the incoming horizontal signal H within the first video display's composite video signal to produce a signal NH which is used to derive the horizontal and vertical deflection signals for controlling cathode ray tube (CRT) raster scan. The frequency multiplied horizontal timing pulse NH is then provided to a filter amplifier and logic level translation circuit 16 for generating a reference input signal for phase lock loop circuit 18. The first stage of filter amplifier 16 includes an emitter-follower stage (not shown) to minimize the loading of the frequency NH signal.

The output signal NH of filter amplifier 16 is then provided as the reference signal input to phase lock loop 18 which generally includes a phase detector 20, a low pass filter 22, and a voltage controller oscillator (VCO) 24. The output of the phase lock loop 18, which is phase locked with the horizontal flyback pulse H of the television receiver 12, is then provided to bipolar amplifier and logic level translation circuit 28 and thence to divider circuit 32 which provides a complementary clock drive signal output NMH. The output from divider circuit 32 is then provided to the video display 30 and back to the phase comparator 20 through a programmable modulo divider 19 via line 26. The clock signal output of voltage controlled oscillator 24 provided to bipolar amplifier 28, divider circuit 32 and thence to programmable modulo divider 19 provides one input to phase comparator 20. The other input to the phase comparator 20 is the reference frequency signal source NH from television receiver 12 provided via a programmable reference divider 17.

In a manner well known, the phase comparator 20 produces a signal on its output which is representative of the phase difference between the two signals provided thereto. The differential output thus provided by phase comparator 20 is transmitted either via line 34 or line 36 to low pass filter 22, depending upon the relative phase of the two input signals provided to phase comparator 20. The output of low pass filter 22 is an integrated voltage and is provided via line 38 to voltage controlled oscillator 24 which is adapted to produce an oscillating signal whose frequency is controlled by the control voltage supplied thereto via line 38 from low pass filter 22. The VCO frequency output signal of voltage controlled oscillator 24 is in phase with the horizontal synchronization signal of the television receiver 12. This synthesized signal is more stable than the horizontal sync component of the composite sync signal which is modulated by the vertical deflection signal of the television receiver 12 and does not suffer from the "jitter" inherent in this signal. The synchronized and phase locked synthesized output signal of voltage controlled oscillator 24 is thence provided to bipolar amplifier and logic translation circuit 28 and then divider circuit 32 for providing a complementary drive signal, if necessary, for the video display 30.

An image presented by video display 30 includes a certain predetermined number of elemental unit areas, or pixels, per horizontal scan line. These pixels are generated by means of a high frequency clock system (not shown) within the video display 30 in regulating the electron beam source. This clocking system is driven by complementary drive signals provided to the crystal 1 and crystal 2 (not shown) inputs of the video display. By providing the signal NMH and its complement to the crystal 1, crystal 2 inputs of video display 30 and by setting NM/2 equal to an integer, an integral number of pixels per horizontal scan line will be included in an image presented by the video display 30. With a signal NMH provided to the video display 30 which is phase locked with the horizontal synchronization signal H of the television receiver 12, the video image presented by video display 30 and superimposed on the received video signal of the television receiver 12 will include an integral number of pixels per horizontal scan line. This eliminates such undesirable video characteristics as edge discontinuities, or "zipper", along the lateral portions of the video display and reduced image sharpness. The phase locked signal NMH is also provided from the output of divider circuit 32 via line 39 to counter/divider 92 for purposes of dividing NMH by NM and producing a synchronizing signal output at the horizontal scan rate of video display 30 which is in time alignment with that of television receiver 12 in a manner which is described in detail below.

The horizontal scan synchronization portion of the present invention, which is shown in the upper portion of FIG. 1, performs the function of insuring the occurrence of the very stable synthesized horizontal sync signal of the second video display 30 within a digital hysteresis window time of the first video display's horizontal sync signal so as to provide accurate overlay of one video image upon the other. Briefly, this portion of the present invention operates in the following manner. A vertical high deflection signal from the television receiver 12 processed by a first logic level translator circuit triggers a monostable multivibrator 58 which in turn enables a second adjustable monostable multivibrator 56 to be triggered by a horizontal flyback pulse from the television receiver 12 processed by a second logic translator circuit. A horizontal flyback pulse occurs within this predetermined enable time period initiated by the occurrence of a vertical high deflection signal in the television receiver only at the beginning of the second interlaced field of raster scan in the television receiver, and then only once. By providing monostable multivibrator 58 with a time constant equal to this predetermined time interval, monostable multivibrator 56 will provide an output only upon the detection of the beginning of the second interlaced field in the raster scan of television receiver 12.

The trailing edge of the output pulse of monostable multivibrator 56 toggles monostable multivibrator 68 to produce a predetermined time interval, or window. This time interval is provided as one input to D-type flip flop 90 which sets its output. The other input to flip flop 90 is provided by the combination of counters 92, 94 and 96 which is the divided-down, stable horizontal sync signal NMH provided to this counter combination by phase lock loop 18 via divider 32. If the divided-down stable horizontal sync signal output of counter 96 falls within the window provided to flip flop 90, D-type flip flop 74, which is responsive to the output therefrom, will not provide an output because it is held disabled for the duration of the time window signal. However, if the horizontal sync signal lies outside this window, the D-type flip flop 74 changes state enabling NAND gate 76, whose output is now held disabled by the output of monostable 56. The next second field output of monostable 56 through NAND gates 76, 78, and 82 will alter the programming load lines of programmable dividers 94 and 96 through NAND gates 78 and 82 and through NAND gates 80 and 84 will load the values of counters 92, 94 and 96 so as to change the number by which the NMH clock signal is divided to the window time divided by 2 so as to center within the window the countdown of counters 92, 94 and 96. This has the effect of repositioning the occurrence of the stable H signal in time to the center of the window which is initiated by the occurrence of television horizontal scan and thus results in the repositioning of the horizontal sync signal of video display 30. By proper selection of the values of counters 92, 94 and 96, the occurrence of the stable sync signal H may be repositioned so as to occur precisely in the middle of the window generated by monostable multivibrator 68. In this manner, the more stable horizontal sync signal provided to video display 30 is synchronized with the horizontal scan of the television receiver 12 within the hysteresis window time.

The thus time-aligned stable horizontal sync signal at the output of monostable multivibrator 98 is produced by the countdown output of counters 92, 94 and 96 which triggers monostable multivibrator 98. This stable horizontal sync signal is then applied to NAND gate 104 to which is also provided the vertical high deflection signal from the logic level translation transistor 42. The output of NAND gate 104 is a composite sync signal provided via line 105 to the video display 30 for controlling the time position of a certain predetermined number of elemental units, or pixels, within each horizontal scan line.

More particularly, the horizontal scan signal synchronization portion of the present invention will now be explained with reference to FIGS. 2A–2G, 3A–3G, and 4A–4G. The horizontal flyback pulse and the vertical high deflection signal of the television receiver 12 are provided to switching transistors and logic level translators 40, 42 via lines 44, 46, respectively. Resistors 41, 45 provide proper biasing for transistors 40, 42, respectively. Resistors 48, 52 perform current limiting functions while the combination of capacitor 50, resistor 52, and grounded resistor 54 removes the DC component of the received vertical high deflection signal.

FIGS. 2A–2G show signal timing in various portions of the synchronization signal stabilization system 10 shown in FIG. 1. The respective letter designations of each of these figures corresponds to a respective lettered portion of FIG. 1. FIGS. 2A–2G present signal timing for the case where the horizontal scan of video display 30 is synchronized with the horizontal scan of the television receiver 12 to within the previously described digitally produced window time W. FIGS. 3A–3G show the situation where the horizontal scans of the respective display devices are out of synchronization. FIGS. 4A–4C illustrate the situation where synchronization of the respective horizontal scans of the two display devices has been reestablished by the present invention. The operation of the system shown in FIG. 1 will be explained in terms of the various signal timing diagrams shown in these figures.

The vertical high deflection signal triggers monostable multivibrator 58 through transistor 42. This produces a pulse of predetermined duration, which in a preferred embodiment of the present invention is approximately 20 microseconds. The horizontal flyback pulse of the television receiver 12 occurs during this 20 microsecond period only at the beginning of the second field in the interlaced raster scan of television receiver 12. When the horizontal flyback pulse does occur during this 20 microsecond period, it triggers monostable multivibrator 56 via transistor 40. The 20 microsecond enable pulse period is also provided to monostable multivibrator 56 by monostable multivibrator 58. The output of monostable multivibrator 56 is a pulse HD which is adjustable in length by means of variable resistor 66 and which is shown in FIG. 2A. In a preferred embodiment, pulse HD is adjustable from approximately 0.7 microseconds to 2 microseconds. Capacitor 62 and resistors 64 and 66 provide proper timing for monostable multivibrator 56.

Figure 2B:
Figure 2C:
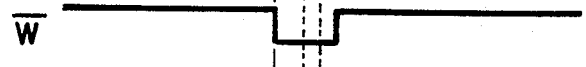
Figure 2D:

The trailing edge of the HD pulse triggers monostable multivibrator 68 which, in turn, produces a pulse of a predetermined time duration, or window, W and its complement $\overline{W}$ as shown in FIG. 2C. The window W is provided by monostable multivibrator 68 via line 69 to the D-type flip flop 90 which causes the $\overline{CHD}$ output to transition to zero as shown in FIG. 2B. This permits flip flop 90 to respond to the next $\overline{B}$ pulse as provided by counter 96 via line 99 thereto. The $\overline{B}$ pulse is shown in FIG. 2D and represents the occurrence of the countdown signal of counters 92, 94 and 96 clocked by the output of phase lock loop 18 through bipolar amplifier and logic level translation circuit 28 and divider 32 and provided via line 39 to counter 92. The window W sets the D-type flip flop 90 so that its $\overline{CHD}$ output is zero, while the $\overline{W}$ output of monostable multivibrator 68 keeps the D-type flip flop 74 in the clear state during the period of window W.

The stable H is derived by dividing down the synthesized NMH signal generated by phase loop 18 by NM using counters 92, 94 and 96. The $\overline{B}$ output of counter 96 provided to flip flop 90 is the "borrow" resulting from the complete countdown of counters 92, 94 and 96. If the $\overline{B}$ signal occurs during window W, the transition of the $\overline{CHD}$ output of flip flop 90 is ignored by D-type flip flop 74 and the $\overline{B}$ input signal to NAND gate 80 via line 79 produces a $\overline{PE}$ output from NAND gate 84 which resets the counters 92, 94 and 96 to modulo NM for the next countdown to produce the signal via line 97 whose leading edge triggers monostable multivibrator 98. The output of multivibrator 98 is the stable H sync signal. Thus, if the $\overline{B}$ output of counter 96 occurs within the window W, no change is made in counters 92, 94 and 96 and no change is made to the timing of the stable trigger signal provided to monostable multivibrator 98. This results in the synchronized signal NMH being divided by NM in counters 92, 94 and 96 in providing the stable trigger signal to monostable multivibrator 98 and thence the stable H sync signal to NAND gate 104 via line 103 where it is logically combined with the vertical high deflection signal generated pulse provided by transistor 42 via line 43 to produce a composite synchronization signal which is provided to the video display 30 via line 105.

Figure 2E:
Figure 2F:
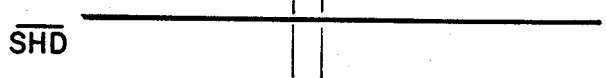
Figure 2G:

The "in sync" situation can be further explained with particular reference to FIGS. 2B–2G. If the $\overline{B}$ signal, which represents the occurrence of the stable H sync trigger signal and countdown computation of counters 92, 94 and 96, occurs within window W, or its complement $\overline{W}$, the output $\overline{CHD}$ of flip flop 90 returns to a logic 1 with this transition ignored by flip flop 74 with its output S remaining unchanged as shown in FIG. 2E. The output of NAND gate 76 $\overline{SHD}$ similarly undergoes no change as shown in FIG. 2F. However, the $\overline{B}$ input to NAND gate 80 and thence to NAND gate 84 causes a $\overline{PE}$ output pulse for resetting counters 92, 94 and 96 as shown in FIG. 2G to modulo NM for the next countdown to produce the stable sync signal H. The C output of the most significant digit of modulo NM at counter 96 triggers monostable multivibrator 98 to produce the desired stable H sync signal period. In a preferred embodiment, NM=684 and the stable H sync signal period provided by monostable multivibrator 98 is approximately 4 microseconds.

Referring to FIGS. 3A–3G, the situation for the occurrence of the $\overline{B}$ pulse outside of the window W is shown. With $\overline{B}$ occurring outside of the window W, the 0 to 1 transition of the $\overline{CHD}$ signal provided by flip flop 90 is detected by flip flop 74 which sets its Q output S to 1. The transition of the S output of flip flop 74 has no immediate effect. However, the arrival of the next leading edge of an HD pulse provided by monostable multivibrator 56 which represents the next second interlaced field of television receiver raster scan, re-programs counters 92, 94 and 96 to divide the signal NMH by another, predetermined number approximately representing the W/2 time interval. The second modulo number is such as to reposition the occurrence of the $\overline{B}$ signal so that it is positioned approximately in the middle of the time interval represented by W. Thus, the stable sync signal H provided to video display 30 is synchronized and time aligned within time W with the horizontal scan of television receiver 12 permitting precise overlay of the image of video display 30 on the presentation of the television receiver 12.

Thus, in referring to FIGS. 3C–3G, it can be seen that if the $\overline{B}$ output of counter 96 fails to occur within window W, nothing occurs at the output of NAND gate 76 during this horizontal scan period and the $\overline{PE}$ pulse provided to counters 92, 94 and 96 results in an out of sync stable H output from monostable multivibrator 98 to NAND gate 104. During the next second field, however, resynchronization occurs as shown in FIGS. 4A–4G. The next leading edge of the HD pulse output of monostable multivibrator 56 results in a change in the modulo of the counter combination from NM to approximately W/2 by producing a $\overline{PE}$ signal through NAND gates 76, 80 and 84. The output S of flip flop 74 generated by the occurrence of $\overline{B}$ outside of window W is removed by the trailing edge of the HD pulse provided by monostable multivibrator 56 initiating W by monostable multivibrator 68. The end of the HD pulse also results in the removal of the $\overline{PE}$ pulse prior to reestablishing module N at the programmable data inputs of the modulo divider comprised of counters 92, 94 and 96. This is due to the propagational delay of the $\overline{SHD}$ signal through NAND gates 80, 84 being less than the propagational delay through the open collector NAND gates 78, 82. The trailing edge of the HD pulse also initiates the window W as shown in FIG. 4C while its leading edge initiates the modulo W/2 count by counters 92, 94 and 96. Upon the completion of the divide by W/2 count, the $\overline{B}$ pulse occurs approximately in the center of the window W as shown in FIGS. 4C and 4D, which corresponds to an occurrence of the stable horizontal sync pulse H approximately 2/NMH seconds delayed from the $\overline{B}$ signal, exactly in the center of the window W as shown in FIGS. 4C and 4D. Counters 92, 94 and 96 are then programmed to a modulo NM with the counter combination then counting down producing, until a subsequent perturbation, a stable horizontal sync signal H which occurs as described. Modulo W/2 corresponds to a counter time interval equal to approximately one half the length of W so that the following B signal occurs approximately in the middle of window W and consequently the stable horizontal sync signal occurs approximately 2/NMH seconds later.

Variable resistance 66 provides for control over the length of the HD pulse. Capacitor 62 and resistors 64 and 66 provide a proper time constant for monostable multivibrator 56. Capacitor 70 and resistor 72 perform a similar function with respect to the monostable multivibrator 68. Resistor 59 and capacitor 61 also provide a time constant function for monostable multivibrator 58. Resistors 86, 88 coupled respectively to NAND gates 78, 82 provide for greater signal propagational delay through these gates than through NAND gates 80, 84. It is this difference in signal propagational delay which programs the counter combination of counters 92, 94 and 96 for controlling the occurrence of the stable synchronization signal H. Capacitor 100 and resistance 102 provide the proper time constant for monostable multivibrator 98.

There has thus been provided a system for overlaying the video image of a first video display by the video image of a second video display by synchronizing and stabilizing the horizontal scan of the second video display with that of the first display. A phase locked stabilization signal is also used to provide an integral number of pixels per horizontal scan line in presenting a sharp, precise video image of the second video display.

While particular embodiments of the present invention have been shown and described, it will be apparent to those skilled in the art that changes and modifications may be made therein without departing from the invention and its broader aspects. The aim in the appended claims, therefore, is to cover all such changes and modifications as fall within the true spirit and scope of the invention.

I claim:

1. A system for synchronizing the horizontal scan H' of a second video display with the horizontal scan H of a first video display for superimposing a second image presented by said second video display on a first image presented by said first video display wherein said second video display includes clock means responsive to a synthesized clock signal for generating an image having an integer number N of elemental areas in each horizontal scan line and wherein said first and second images are respectively comprised of first and second interleaved horizontal scan fields, said system comprising:

pulse detection means coupled to said second video display for detecting a horizontal flyback pulse occurring at the beginning of said second horizontal scan field of said first video display;

timing means coupled to said pulse detection means and responsive to said horizontal flyback pulse for generating a timing window W following the occurrence of said horizontal flyback pulse;

signal processing means coupled to said second video display and responsive to a horizontal scan signal NH therein for generating a signal having a frequency NMH phase locked to said clock means in said second video display for providing an integral number of elemental areas in each horizontal scan line of said second video display;

programmable divider means coupled to said signal processing means for generating a divided-down synchronous horizontal scan signal; and detector means coupled to said timing means and said programmable divider means for detecting when said divided-down synchronous horizontal scan signal occurs outside of said window for generating a correction signal and providing said correction signal to said programmable divider means;

wherein said programmable divider means is coupled to said first video display for time aligning said synchronous horizontal scan signal with said correction signal and providing a resultant synchronous signal to said second video display for synchronizing the horizontal scan thereof with that of said first video display.

2. A system as in claim 1 wherein said signal processing means includes a frequency multiplying circuit coupled to said first video display for multiplying said horizontal scan signal NH and a phase lock loop circuit responsive to said multiplied signal provided thereto as a reference signal frequency for generating said output signal NMH synchronized and phase locked with said horizontal scan signal NH.

3. A system as in claim 1 wherein a vertical high pulse and said horizontal flyback pulse are provided to said pulse detection means for the detection of said second horizontal scan field in said first video display with said synchronous horizontal scan signal H' occuring within a predetermined time interval following the occurrence of said horizontal flyback pulse in said first video display.

4. A system as in claim 3 wherein said vertical high pulse is provided to a first bistable circuit element and said horizontal flyback pulse is provided to a second bistable circuit element with the output of said second bistable circuit element comprising a horizontal delay pulse of adjustable duration.

5. A system as in claim 4 wherein the horizontal delay pulse includes a leading edge and a trailing edge with said timing means responsive to the trailing edge thereof for generating said timing window W and said programmable divider means responsive to the leading edge thereof for generating said divided-down synchronous and phase locked horizontal scan signal.

6. A system as in claim 4 wherein said first and second bistable circuit elements each include a monostable multivibrator.

7. A system as in claim 6 wherein said timing means include a third bistable circuit element responsive to the output of said pulse detection means for generating said timing window.

8. A system as in claim 7 wherein said third bistable circuit element includes a flip-flop circuit.

9. A system as in claim 1 wherein said programmable divider means includes a plurality of serially coupled counter circuits for dividing said synthesized frequency signal NMH by a first predetermined number when said synchronization signal occurs within said window W and by a second predetermined number when said synchronization signal occurs outside of said window W.

10. A system as in claim 1 wherein said detector means is coupled to said programmable divider means by means of a plurality of logic NAND gates defining two parallel signal paths therebetween and wherein the signal propagational delay between said two parallel paths determines the number by which said synchronous horizontal scan signal NMH is divided by said programmable divider means when said synchronous and phase locked horizontal scan signal occurs outside of said window W.

11. A system as in claim 9 wherein the output of said programmable divider means is provided to one of said parallel signal paths between said detector means and said programmable divider means in a feedback signal arrangement for generating said correction signal.

12. A system as in claim 1 wherein said detector means includes first and second coupled flip flops circuits wherein said first flip flop circuit is coupled to said timing means and to said programmable divider means for respectively receiving said timing window W and the divided-down horizontal synchronization signal and for providing an output signal to said second flip flop circuit when said synchronization signal is not within said window W with said second flip flop circuit coupled to said programmable divider means for providing a second output signal thereto in response to said first output signal.

13. A system for synchronizing the horizontal scan of a second video display with the horizontal scan of a first video display for overlaying a second image of said second video display on a first image of said first video display, said system comprising:

means for detecting a second horizontal scan field in said first video display, said second horizontal scan field detection means responsive to a horizontal flyback pulse and a vertical high signal of said first video display;

second means coupled to said first video display for receiving said horizontal flyback pulse therefrom and for generating a synthesized clock signal synchronized and time aligned with said horizontal flyback pulse;

third means coupled to said second horizontal scan field detection means for generating a pulse W in response to the beginning of said second horizontal scan field;

programmable dividing means coupled to said second means for receiving said synthesized clock signal and for selectively dividing said synthesized clock signal by NM in delaying the occurrence of said synthesized clock signal;

logic means coupled to said third means and to said programmable dividing means for detecting when said synthesized clock signal does not occur within said pulse W and for programming said dividing means to divide said synthesized clock signal by W/2 so that said synthesized clock signal occurs within said pulse W; and sixth means coupling said programmable dividing means to said second video display in providing said synthesized clock signal or said divided-down synthesized clock signal to said second video display when said synthesized clock signal does or does not occur outside of said pulse W, respectively, in synchronizing the horizontal scan of said first and second video displays.

* * * * *